Sept. 29, 1959    M. HEFTI    2,906,390
SPROCKET ROLLER CHAIN
Filed Jan. 17, 1956    5 Sheets-Sheet 1
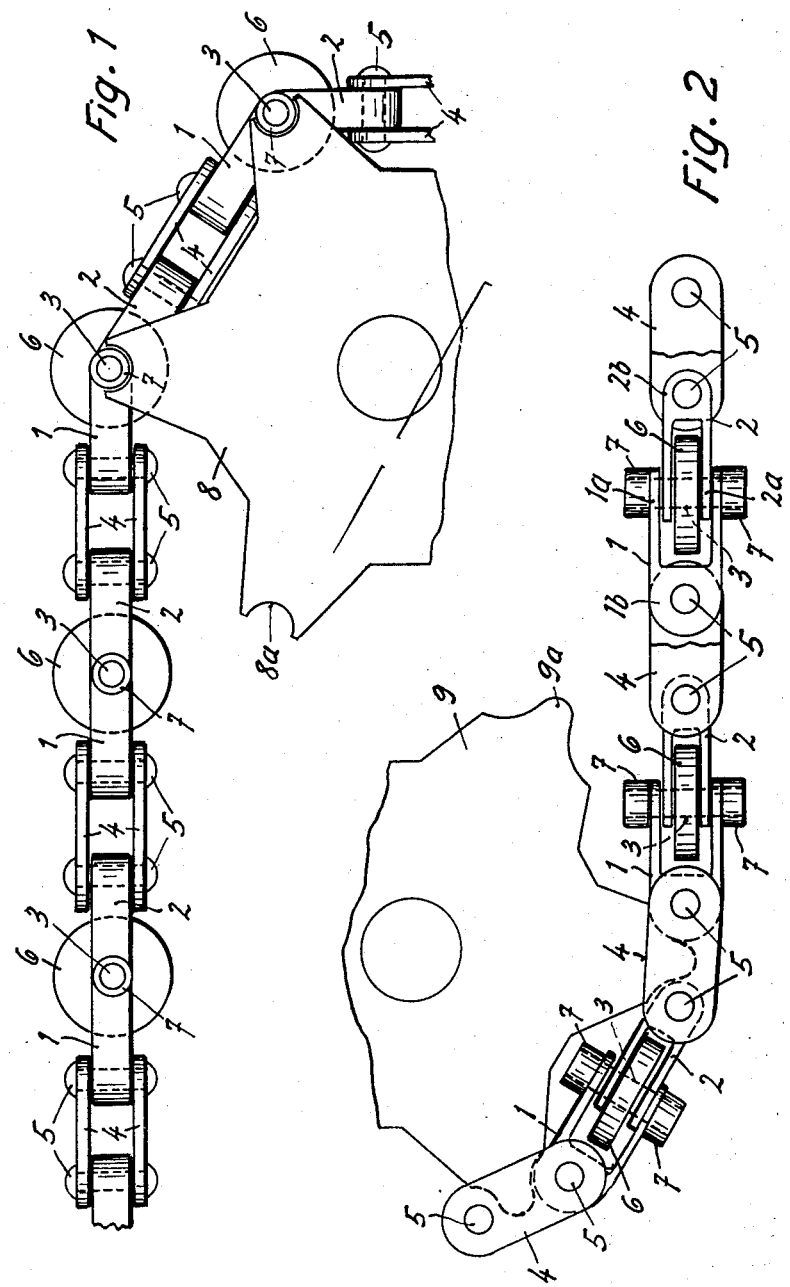

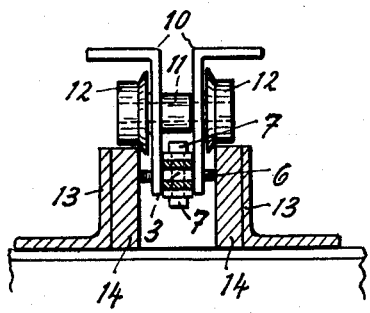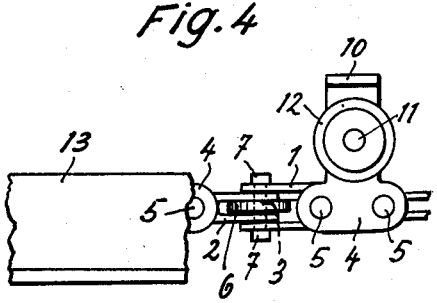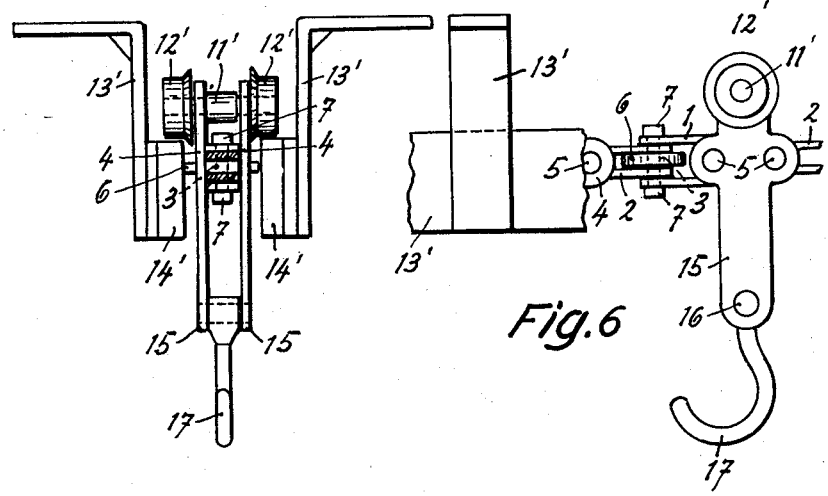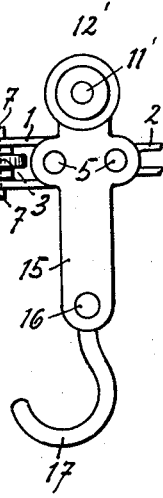

Sept. 29, 1959 M. HEFTI 2,906,390
SPROCKET ROLLER CHAIN
Filed Jan. 17, 1956 5 Sheets-Sheet 3

Inventor
Martin Hefti
By Michael S. Struker
agt.

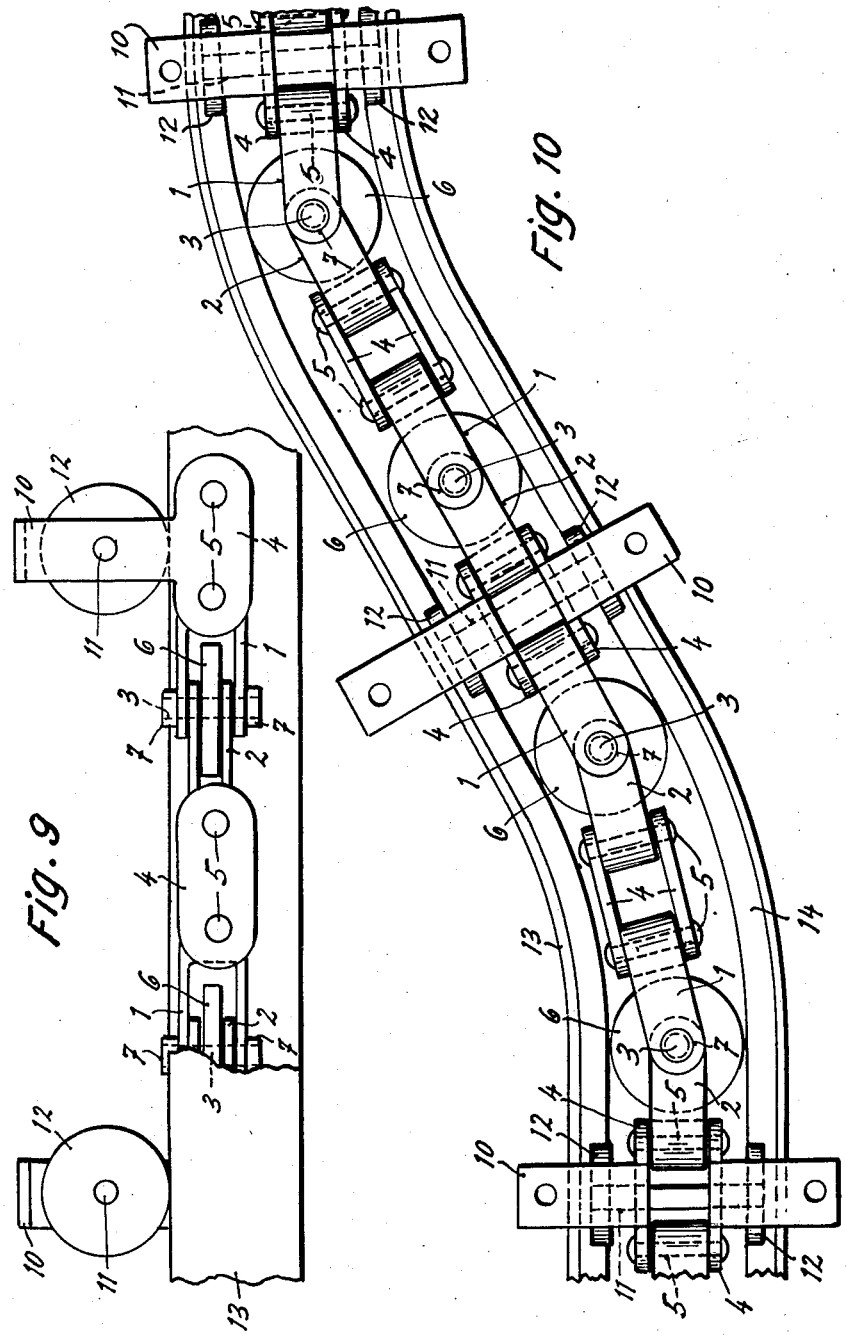

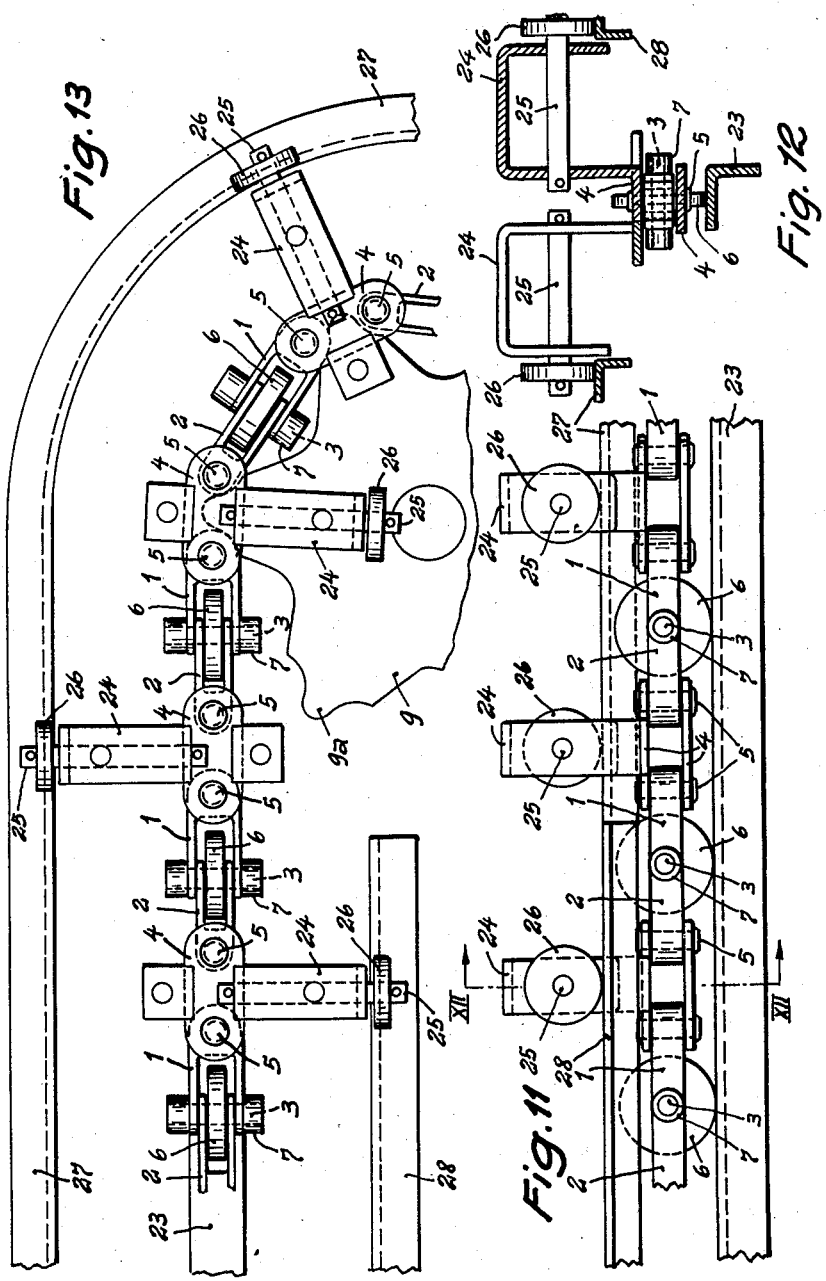

United States Patent Office 2,906,390
Patented Sept. 29, 1959

2,906,390
SPROCKET ROLLER CHAIN
Martin Hefti, Bach, Switzerland

Application January 17, 1956, Serial No. 559,733

Claims priority, application Switzerland September 8, 1955

3 Claims. (Cl. 198—16)

The present invention relates to a sprocket roller chain adapted to travel in a curve and as compared with known chains of the type being characterized in that it comprises links solid at one end and forked at the other, the fork limbs of which interengage in pairs each pivotally mounted on a throughgoing pin, and that the the solid ends of these forked double links are each pivotally interconnected by two spaced parallel sideplates and two rivet pins passing through the solid ends of the forked links in bores at right angles to the bolts holding the fork limbs together, and further that on each of said bolts a chain roller is supported within each inner fork.

In the known conveyer chains capable of traveling in a curve, the guide rollers are arranged above and below the chain, whereby in long tracks or when traveling in curves, due to very severe tensions in the chain, torsional stresses are set up which damage track and chain. Also in known sprocket roller chains, owing to the great distances between the single supporting rollers, great sagging occurs which causes restless and jerky running of the chain.

In contrast to these known sprocket roller chains, the sprocket roller chain according to the invention possesses carrying or guide rollers serving as rolling supports for the chain when in the vertical position, or guiding the chain in the horizontal position between running rails in curves, free from twisting, quiet and vibrationless.

According to the invention the sprocket roller chain traveling in curves includes laterally extending roller bolts which may be strengthened by being furnished with bushes, and ensure a satisfactory cooperation with the driving or guiding sprocket wheels.

The flat chain sideplates interconnecting the forked double links may be provided with upwardly projecting extensions serving as carrying yokes for overlapping-scale members or conveyer belts, in order to use the chain as conveyer track. The sideplates of the chain may also be provided with downwardly projecting extensions or suspension hooks to utilize the chain as cableway. It is further possible to provide the sideplates designed as carrying yokes with carrying rollers, whereby the chain rollers lying within the forked double links would take over the guiding of the chain in curves. Finally it is possible to arrange carrying frames for platforms or the like on the carrying yokes fitted with carrying rollers, and to provide said frames with additional carrying rollers, for the guiding of which there are special rails independent of the chain guiding.

The accompanying drawing shows by way of example some preferred forms of embodiment incorporating the invention.

Fig. 1 is a lateral view of a sprocket roller chain adapted to travel in a curve in connection with a driving sprocket wheel rotatable about a horizontal axle;

Fig. 2 is a top view of the sprocket roller chain as shown in Fig. 1 with certain parts in horizontal section and in connection with a guide sprocket wheel rotatable about a vertical axle;

Fig. 3 is a sectional view of a sprocket roller chain arranged for use as conveyer track, with pertinent guiding rails;

Fig. 4 is a lateral view of the chain as shown in Fig. 3, with guide rails partly broken away;

Fig. 5 is a sectional view of a sprocket roller chain for use as cableway, with pertinent guide rails;

Fig. 6 is a lateral view of the chain as shown in Fig. 5, with guide rails partly broken away;

Fig. 9 is a lateral view of the sprocket roller chain with additional carrying roller for use as conveyer traveling in a curve;

Fig. 10 is a top view of the chain as shown in Fig. 9;

Fig. 11 is a lateral view of a chain for use as for conveyer belts, with its guide rails;

Fig. 12 is a cross-section to Fig. 11, and

Fig. 13 shows a top view of the chain as shown in Figs. 11 and 12.

Figure 7:
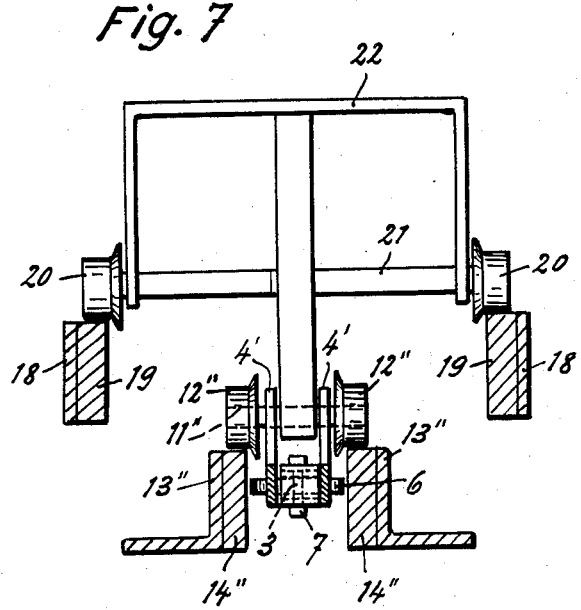
Fig. 7 is a cross-section of a sprocket roller chain with guide rails and additional carrying frames, say, for constructing moving stairways traveling in a curve.

Referring to the first example of embodiment as shown in Figs. 1 and 2, numerals 1 and 2 designate chain links solid at one end and forked at the other, the fork limbs 1a, 2a thereof interengage in pairs pivotally mounted on a through-going pin 3. The solid ends 1b, 2b of forked links are each pivotally interconnected by spaced parallel sideplates 4 together with rivet pins 5 passing through the solid ends of the forked links in bores at right angles to the pins 3. Supported on the pins 3 holding the limbs of the forked links together, is a chain roller 6 within each forked link 2. The pins 3 are extended beyond the outer fork limbs 1a and at these extensions fitted with bushes 7 pressed-on. With these bushes or extensions the pins 3 engage in appropriate recesses 8a of a driving sprocket wheel 8. Numeral 9 denotes a guiding sprocket wheel rotatable round a vertical axle, the sprockets 9a of which wheel being adapted to engage between the sideplates 4 or solid ends 1b and 2b of the forked links of the chain.

In the chain as shown in Figs. 1 and 2, the rollers 6 are arranged in vertical planes, that is upright, so as to carry the chain rolling in a corresponding guideway (not shown). Any sagging of the chain parts lying between each two rollers 6 is thus practically excluded.

In the second example of embodiment according to Figs. 3 and 4, numerals 1 and 2 again designate the forked links, 3 the pins interconnecting the fork limbs, 4 the sideplates of the chain, 5 the rivet pins of the side plates, 6 the chain rollers arranged as lying (not upright) in this example, and 7 the bushes seated on the extensions of the pins 3.

In contradistinction to the example of embodiment described hereinbefore, in the example according to Figs. 3 and 4 the sideplates 4 of the chain are provided with upwardly projecting extensions designed as carrying yokes 10 which are each interconnected by a pin 11 having carrying rollers 12 arranged on its extensions passing through the carrying yokes 10. For the purpose of supporting these carrying rollers 12 there are guide rails 13 fitted with a rubber covering 14 to ensure quiet running at the treads. The sprocket roller chain as illustrated in Figs. 3 and 4 is particularly adapted for the structure of conveyers, whereby the chain rollers 6 as lying serve for guiding the chain in curves. To the carrying yokes 10 overlapping scale members or conveyer belts may be fastened.

In the third example of embodiment according to Figs. 5 and 6, numerals 1 and 2 again designate the forked links, 3 the pins interconnecting the fork limbs, 4 the sideplates, 5 the rivet pins uniting same, 6 the chain rollers seated on the pins (or bolts) 3, and 7 the bushes mounted on the extensions.

Also in this example of embodiment the sideplates 4 of the chain include upwardly projecting extensions held together in pairs by an axle bolt 11′ having carrying rollers 12′ which are arranged on the extensions thereof and rest on rubber ways 14′ of guide rails 13′. As contrasted to the example according to Figs. 3 and 4, in the example according to Figs. 5 and 6, the sideplates 4 also have downwardly projecting extensions 15 each interconnected by an axle pin 16 having a suspension hook 17 pivotally mounted thereon. The chain as shown in Figs. 5 and 6 is particularly suitable for the structure of cableways, whereby the chain rollers 6 as lying take over the guiding of the chain in curves.

Figure 8:
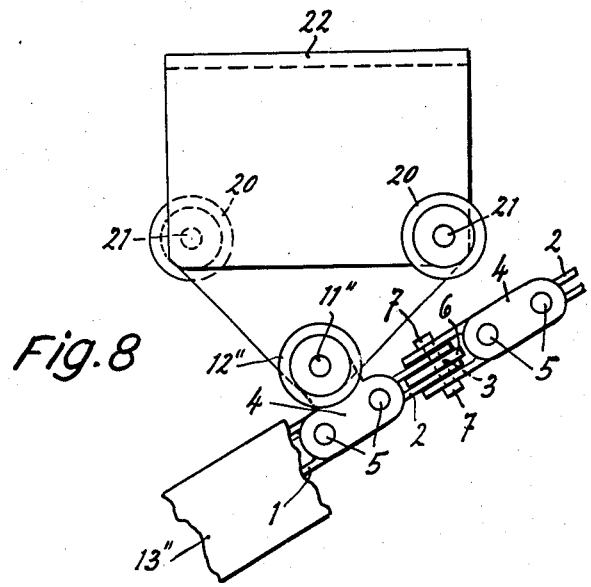
Fig. 8 is a lateral view of the chain as shown in Fig. 7, with guide rails partly broken away.

Also in the fourth example of embodiment according to Figs. 7 and 8, numerals 1 and 2 again designate the forked links, 3 the pins pivotally interconnecting the fork limbs, 4 the sideplates, 5 the rivet pins connecting same to the forked links, 6 the chain rollers supported by the pins 3, and 7 the bushes brought onto the pins 3.

Also in this example of embodiment the sideplates 4 are extended upwards, each of these extensions 4′ being held together by an axle pin 11″, on the extended extremities of which rollers 12″ are mounted. 13″ and 14″ denote the rails for the carrying rollers 12″, while 18 and 19 designate additional guide rails for further carrying rollers 20, each mounted on axles 21 of a carrying frame 22 pivoted to the axle pin 11″ and swiveling in the running plane of the chain.

The chain as illustrated in Figs. 7 and 8 is particularly adapted for the structure of stairways moving in curves, the carrying frame 22 serving to receive the steps.

The fifth example of embodiment as in Figs. 9 and 10 essentially corresponds to that according to Figs. 3 and 4. It is distinguished from the latter only in that the carrying yokes 10 are not arranged at each sideplate but at every alternate pair of sideplates, and that the horizontal flanges of the carrying yokes extend somewhat farther than in the example as in Figs. 3 and 4. As to the rest, again in this case numerals 1 and 2 designate the forked links, 3 the pins interconnecting the fork limbs, 4 the sideplates, 5 the rivet pins holding them together, 6 the chain rollers mounted on pins 3; 7 the bushes brought onto the extensions of the pins 3, 11 the axle pins holding the carrying yokes 10 together with the carrying rollers 12 mounted thereon. Similarly to the example as shown in Figs. 3 and 4, the chain according to Figs. 9 and 10 is particularly adapted for the structure of conveyers.

In the sixth example of embodiment as shown in Figs. 11 to 13, numerals 1 and 2 again designate the forked links, 3 the pins interconnecting the fork limbs, 4 the sideplates with the rivet pins 5; 6 the chain rollers and 7 the bushes brought onto the extensions of the pins 3.

In contrast to the examples of embodiment according to Figs. 3–10, the chain rollers 6 are arranged not as lying but upright and supported on a centre rail.

Also in this example of embodiment the sideplates 4 are provided with yoke-shaped extensions 24, however in such a way that the extensions of two successive pairs of sideplates alternately project to opposite sides as apparent from Fig. 13. Supported by these lateral extensions 24 are upright carrying rollers 26 mounted on horizontal axles 25, for the support of which two guide rails 27 and 28 are arranged at both sides of the chain, running parallel thereto. In the curve as in Fig. 13, the chain is guided by a sprocket wheel 9 rotatable round a vertical axle, the sprockets 9a of which engage between the sideplates 4 or the solid ends of the forked links, 1, 2.

In order to be able to suit the rails more conveniently in the curves, they may consist, instead of angle irons, of some pliable material, such as steel strip.

What I claim is:

1. In a conveying system for transporting escalator steps or the like, in combination, a bendable elongated conveyor chain including guide roller means turnably carried by links of said chain for movement between elongated guide means; an attaching member mounted on said bendable elongated conveyor chain; frame means turnably mounted on said attaching means for turning movement about a given axis; first roller means mounted on said attaching means for movement along first supporting guide means; and second roller means mounted on said frame means spaced from said first roller means for movement along second supporting guide means said two roller means being turnable about axes parallel to said given axis and being adapted to support said frame means during movement by said bendable elongated conveyor chain along said supporting guide means in fixed relation to the same, the axes of said guide roller means extend, when said chain is not bent, substantially parallel to each other and substantially normal to the axis of said first and second roller means.

2. In a conveying system for transporting escalator steps or the like, a sprocket chain for curved travel including pairs of oppositely facing side plates located on opposite sides of said chain and adapted to pivotally interconnect adjacent links of said chain at one end of said links, and pivot means extending substantially normal to said side plates for interconnecting adjacent links at the other ends thereof, each pair of said side plates having upwardly extending parallel extensions, each of said extensions formed with a hole; a first axle extending through said holes formed in said parallel extensions, said first axle having free end portions; first roller means mounted on said free end portions of said first axle for movement along a pair of spaced surfaces of one pair of supporting guide means; frame means pivotally mounted on said first axle for turning movement about the axis thereof; a pair of second axles mounted spaced from each other and substantially parallel to said first axle on said frame means; second roller means attached to opposite ends of each of said second axles for movement along another pair of supporting guide means; and guide roller means turnably mounted on said pivot means for movement between a pair of surfaces substantially normal to said pair of spaced surfaces.

3. A conveying system for transporting escalator steps or the like comprising, in combination, a sprocket roller chain means for curved travel including a plurality of U-shaped links, the open-end extremities of a pair of said links pivotally engaging one another, a guide wheel located for rotation within said open-end extremities of each pair of links, a pin coaxial with said guide wheel connecting each of said pair of links and turnably supporting said guide wheel, a pair of oppositely facing side plates for interconnecting the closed end extremities of each pair of links, respectively, one of said side plates of said pair of side plates located on one side of said chain and the other of said side plates of said pair of side plates located on the corresponding opposite side of said chain, each pair of side plates having upwardly extending parallel extensions, each of said extensions formed with a hole, and a plurality of rivets pivotally connecting said side plates to said links; sprocket means for transporting said chain; a first axle extending through said hole formed in said parallel extensions, said first axle having free end portion; a first roller means mounted on said free end portions of said first axle for movement along one pair of supporting guide means; frame means pivotally mounted on said first axle for turning movement about the axis thereof; a pair of second axles mounted spaced from each other and substantially parallel to said first axle on said frame means; and second roller means attached to opposite ends of each of said second axles for movement along another pair of guide means, said first and second axles extending respectively in a direction normal to said pin.

References Cited in the file of this patent

UNITED STATES PATENTS

| | | |
|---|---|---|
| 1,090,948 | Sklovsky et al. | Mar. 24, 1914 |
| 1,445,588 | Hendry | Feb. 13, 1923 |
| 1,541,539 | Webb | June 9, 1925 |
| 2,613,546 | Jorgensen | Oct. 14, 1952 |
| 2,621,609 | McCaul | Dec. 16, 1952 |
| 2,789,685 | Orwin | Apr. 23, 1957 |